E. H. ANSHELM.
CIGAR LIGHTER FOR STEERING WHEELS.
APPLICATION FILED JAN. 20, 1920.

1,395,548.

Patented Nov. 1, 1921.

Inventor:
Edward H. Anshelm,
by his attorney,
Charles N. Gooding.

UNITED STATES PATENT OFFICE.

EDWARD H. ANSHELM, OF CAMBRIDGE, MASSACHUSETTS, ASSIGNOR TO DANIEL I. HAYES, OF PAWTUCKET, RHODE ISLAND.

CIGAR-LIGHTER FOR STEERING-WHEELS.

1,395,548.  Specification of Letters Patent.  Patented Nov. 1, 1921.

Application filed January 20, 1920. Serial No. 352,729.

*To all whom it may concern:*

Be it known that I, EDWARD H. ANSHELM, a citizen of the United States, residing at Cambridge, in the county of Middlesex and State of Massachusetts, have invented new and useful Improvements in Cigar-Lighters for Steering-Wheels, of which the following is a specification.

This invention relates to cigar and cigarette lighters for use in connection with the steering wheels of vehicles such as automobiles, aeroplanes, motor boats and the like.

Since the advent of swift moving vehicles, which are adapted to be steered and controlled by or from a steering wheel, it has always been found difficult by the operators of said vehicles if they desired to start smoking while still operating the vehicle to locate and manipulate the various articles required without danger of losing control of the vehicle and thereby endangering the lives of its occupants or causing injury to the vehicle.

It is an object therefore of this invention to combine a cigar lighter with the steering wheel of a vehicle in order to provide the driver of said vehicle with a convenient and safe means of lighting a cigar or cigarette while still driving the vehicle without danger of losing control of said vehicle while so doing.

It is also an object of the invention to so construct a cigar lighter that the same will form a part of the structure of a steering wheel, one of the spokes of said wheel being so constructed as to form a casing for the lighter, all of the mechanism of the lighter being inclosed within said casing with the exception of the generator which constitutes the source of electric supply.

It is still further an object of the invention to provide a novel mechanism for producing a spark and causing said spark to ignite a wick, thereby providing a flame with which a cigar may be lighted.

The invention consists in the combination and arrangement of parts set forth in the following specification and particularly pointed out in the claims thereof.

Referring to the drawings.

Like numerals refer to like parts throughout the several views of the drawings.

Figure 1:
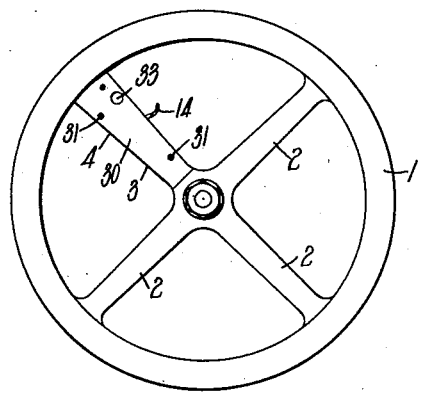
Figure 1 represents a front elevation of a combined lighter and steering wheel embodying my invention.

In the drawings, 1 represents a steering wheel provided with a plurality of spokes 2 of the usual construction and a spoke 3 differing from the spokes 2 in that it is constructed in the form of a casing 4, the interior of which constitutes a chamber 5 in which are mounted a portion of the instrumentalities for making an electric spark and thereby producing a flame which may be utilized to light cigars, cigarettes and the like. Pivotally mounted at 6 within the chamber 5 is a V-shaped receptacle 7 which is provided with a neck constituting a burner 8 in which a suitable wick 9 is tightly held. The fuel receptacle 7 is adapted to contain oil or any other suitable liquid fuel, which will impregnate the wick 9 and cause the same to be easily ignited with a flame as desired.

Figures 2, 3:
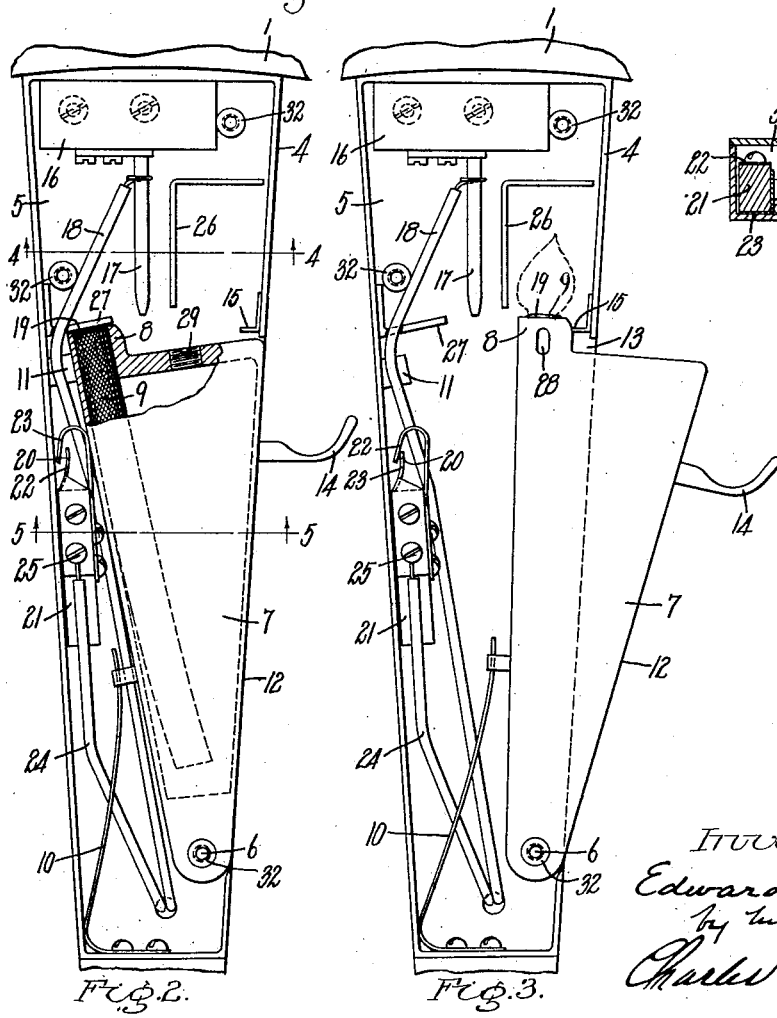
Fig. 2 is a front elevation of a cigar lighter embodying my invention, the cover plate being removed and a portion of the fuel receptacle being broken away to more clearly illustrate the device.
Fig. 3 is a front elevation similar to Fig. 2, the fuel receptacle being illustrated in its extreme outer position.

The fuel receptacle 7 is normally held in the position illustrated in Fig. 2 by a flat spring 10 at which time it abuts against a stop 11 so positioned that an outer edge 12 of the fuel receptacle will aline with the edge of the casing 4 and close an opening 13 provided in said casing and through which the fuel receptacle projects when rocked to the position illustrated in Fig. 3. The fuel receptacle is rocked by engaging a finger piece 14 which is located upon the outer edge 12 of said receptacle and pulling the latter outwardly against the tension of the spring 10 through the opening 13 until it engages a stop 15, as illustrated in Fig. 3. When released the fuel receptacle will automatically return to the position illustrated in Fig. 2. The wick 9 is ignited by electric sparks which are produced during the rocking movement of the fuel receptacle, the said receptacle performing the function of an electric circuit making and breaking device and also being a medium for transmitting the electric current.

Located in the upper part of the chamber 5 is an insulating block 16 to which is fastened an electrode 17. A wire 18 is attached to the electrode 17, the said wire connecting with an electric generator, not illustrated in the drawings, but of a type commonly used for automobiles.

The upper end of the burner 8 constitutes another electrode 19 and is so arranged that as the fuel receptacle is rocked from the position illustrated in Fig. 2 to that illustrated in Fig. 3 said end will pass very close to the lower end of the electrode 17 and the electric current will jump across the space which intervenes between the two electrodes and create sparks which will immediately ignite the end of the wick 9 which is projecting very slightly beyond the upper end of the burner 8.

When the device is used on automobiles where the steering wheel has communication with the frame to which the electric current from the generator is grounded, the only wire needed to complete the electric circuit is the wire 18 and the fuel receptacle 7 constitutes in itself an electric circuit making-and-breaking device for opening and closing the electric circuit. At such times the electric circuit is as follows: From the electric generator to a ground which includes the casing 4, thence through the fuel receptacle 7, burner 8, electrode 19, across the space to the electrode 17, and thence through the wire 18 back to the electric generator. There are instances, however, where the steering wheel is not in communication with the ground as, for example, in motor boats.

Figure 5:
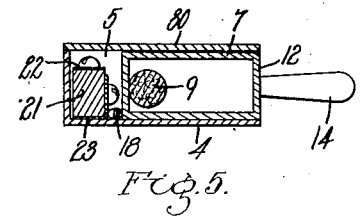
Fig. 5 is a transverse section taken on the line 5—5 of Fig. 2.

It is also evident that a cigar lighter embodying my invention may be adapted to be attached to objects other than steering wheels. In such cases it is necessary to provide an additional connection to the electric generator to complete an electric circuit. It is also advisable at times to provide an additional switch for opening and closing the electric circuit. To meet these emergencies, therefore, there is located in the chamber 5 in a position to be operated by the fuel receptacle 7, a switch 20 which includes an insulating block 21 and flexible contact plates 22 and 23 fastened thereto. A portion of the contact plate 23 extends beneath the insulating block 21, as illustrated in Fig. 5, and contacts with the casing 4. A wire 24 attached to the contact plate at 25 connects with the electric generator before mentioned. When the fuel receptacle is located in the position illustrated in Fig. 2, it engages the contact plate 23 and forces it away from the contact plate 22, thereby breaking the electric circuit at the switch 20. The electric circuit, however, is also broken by reason of the fact that the electrodes are not in alinement and the gap therebetween is too wide for the current to jump across.

Figure 4:
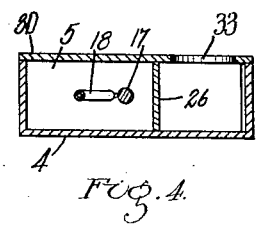
Fig. 4 is a transverse section taken on the line 4—4 of Fig. 2.

When the electrodes are in a position for the electric current to pass therebetween the electric circuit is as follows: from the electric generator, not shown, through the wire 24 to the contact plate 22, thence through the contact plate 23 to the casing 4, fuel receptacle 7 which includes the burner 8 and electrode 19, across the space to the electrode 17 and thence through the wire 18 back to the electric generator. A partition 26 is suitably located above the position occupied by the burner 8 when the same is located as illustrated in Fig. 3, the said partition acting to confine the flame within a limited area. Another partition 27 is located directly above the burner 8 when said burner is located as illustrated in Fig. 2 and serves to extinguish the flame when said burner passes therebeneath. An opening 28 located in one side of the burner is provided for the purpose of engaging the wick 9 in order that the same may be pushed upward in said burner as the wick is consumed. Liquid fuel may be placed within the fuel receptacle by removing a screw 29 and pouring said fuel through the screw hole. A cover plate 30 is fastened to the casing 4 by screws 31 which engage posts 32 fast to said casing. An opening 33, see Figs. 1 and 4, is provided in the cover plate 30 and a cigar or cigarette may be inserted through said opening to contact with the flame.

The operation of my improved device is as follows: When it is desired to light a cigar or cigarette the finger piece 14 of the fuel receptacle is engaged and the fuel receptacle is moved toward the right from the position illustrated in Fig. 2 to that illustrated in Fig. 3. As the burner 8, the end of which constitutes an electrode, approaches the electrode 17 the electric current will jump across the gap which intervenes between said electrodes, thereby creating sparks which will immediately ignite the wick 9. If the wick 9 is not immediately ignited, the fuel receptacle may be oscillated back and forth continuously until the sparks succeed in igniting the wick 9. When the flame is finally produced the fuel receptacle is moved to its extreme outward position at which time the flame will aline with the opening 33 in the cover plate 30 and the cigar or cigarette may be inserted through said opening into contact with said flame. After the cigar is lighted the finger piece 14 is disengaged and the spring 10 will automatically return the fuel receptacle to the position illustrated in Fig. 2. At this time the burner 8 will pass beneath the partition 27 and the flame will be immediately extinguished.

Having thus described my invention what

I claim and desire by Letters Patent to secure is:

1. A steering wheel embodying therein a hollow spoke constituting a casing, a source of electric supply, and manually operated flame producing means located within said spoke and connected with said source of electric supply.

2. A steering wheel embodying therein a hollow spoke constituting a casing, a source of electric supply, manually operated flame producing means located within said spoke and connected with said source of electric supply, and means to automatically extinguish said flame.

3. A steering wheel embodying therein a hollow spoke constituting a casing, a source of electric supply, a wick, and manually operated means connected with said source of electric supply and located within said spoke for creating sparks and thereby producing a flame within said spoke upon said wick.

4. A steering wheel embodying therein a hollow spoke constituting a casing, a source of electric supply, an inflammable wick, a pair of electrodes located within said spoke and connected with said source of electric supply, and manually operated means for creating electric sparks between said electrodes and thereby producing a flame within said spoke upon said wick.

5. A steering wheel embodying therein a hollow spoke constituting a casing, a source of electric supply, an inflammable wick, a pair of electrodes located within said spoke and connected with said source of electric supply, manually operated means for creating electric sparks between said electrodes and thereby producing a flame within said spoke upon said wick, and means to automatically extinguish said flame.

6. A steering wheel, embodying therein, a hollow spoke constituting a casing and provided with an opening communicating with the interior thereof, a source of electric supply, means located within said spoke and connected with said source of electric supply for producing a flame, and means to aline said flame with said opening.

7. A steering wheel, embodying therein, a hollow spoke constituting a casing and provided with an opening in the upper face thereof, a source of electric supply, a fuel receptacle, a wick in said fuel receptacle and means located within said casing and connected with said source of electric supply for producing a flame at the end of said wick, said fuel receptacle being adapted to rock and thereby move said flame to register with said opening.

8. A steering wheel, embodying therein, a hollow spoke constituting a casing and provided with an opening in the side thereof, a source of electric supply, a fuel receptacle located within said casing and adapted to oscillate through said opening, and means connected with said source of electric supply to produce a flame within said casing during the oscillatory movement of said fuel receptacle.

9. A steering wheel embodying therein a hollow spoke provided with an opening in the side thereof, a source of electric supply, a fuel receptacle located within said spoke adapted to close said opening and to oscillate therethrough, a wick in said fuel receptacle, and means connected with said source of electric supply to create sparks and thereby ignite said wick during the oscillatory movement of said fuel receptacle.

10. A steering wheel embodying therein a hollow spoke, a source of electric supply, a fuel receptacle adapted to oscillate within said spoke, a burner formed integral with said fuel receptacle and also constituting an electrode, a second electrode mounted within said spoke, and a wick in said fuel receptacle, said wick being adapted to be ignited by sparks created by said electrodes during the oscillatory movements of said fuel receptacle.

11. A steering wheel embodying therein a hollow spoke, a source of electric supply, a fuel receptacle adapted to oscillate within said spoke, a burner formed integral with said fuel receptacle and also constituting an electrode, a second electrode mounted within said spoke, and a wick in said fuel receptacle, said wick being adapted to be ignited to produce a flame by sparks created by said electrodes during the oscillatory movements of said fuel receptacle, and means to extinguish said flame.

12. A steering wheel embodying therein a hollow spoke, a source of electric supply, a fuel receptacle adapted to oscillate within said spoke and constituting an electric circuit making and breaking device, a burner formed integral with said fuel receptacle and also constituting a movable electrode, a stationary electrode, a wick in said fuel receptacle, said wick being adapted to be ignited by sparks created by said electrodes during the oscillatory movements of said fuel receptacle, an electric switch arranged to be automatically operated by said fuel receptacle, and means to normally hold said fuel receptacle against said switch and thereby break an electric circuit therethrough.

13. A cigar lighter having, in combination, a casing, a fuel receptacle adapted to oscillate within said casing, a wick in said fuel receptacle, an electric switch, means to normally hold said fuel receptacle against said switch and thereby break an electric circuit therethrough, a pair of electrodes and means to automatically close said electric circuit through said switch and ignite said wick during the oscillatory movements of said fuel receptacle.

14. A cigar lighter having, in combination, a casing provided with an opening in the side thereof, a fuel receptacle adapted to oscillate within said casing and through said opening, a wick in said fuel receptacle, an electric switch, means to normally hold said fuel receptacle against said switch and thereby break an electric circuit therethrough, a pair of electrodes, and means to automatically close said electric circuit through said switch and ignite said wick during the oscillatory movements of said fuel receptacle.

In testimony whereof I have hereunto set my hand in presence of two subscribing witnesses.

EDWARD H. ANSHELM.

Witnesses:
MARGARET T. FARRELL,
FRANKLIN E. LOW.